Oct. 9, 1928.
F. C. THOMPSON
1,686,672
AUTOMATIC COMPENSATING SPROCKET
Filed March 10, 1924
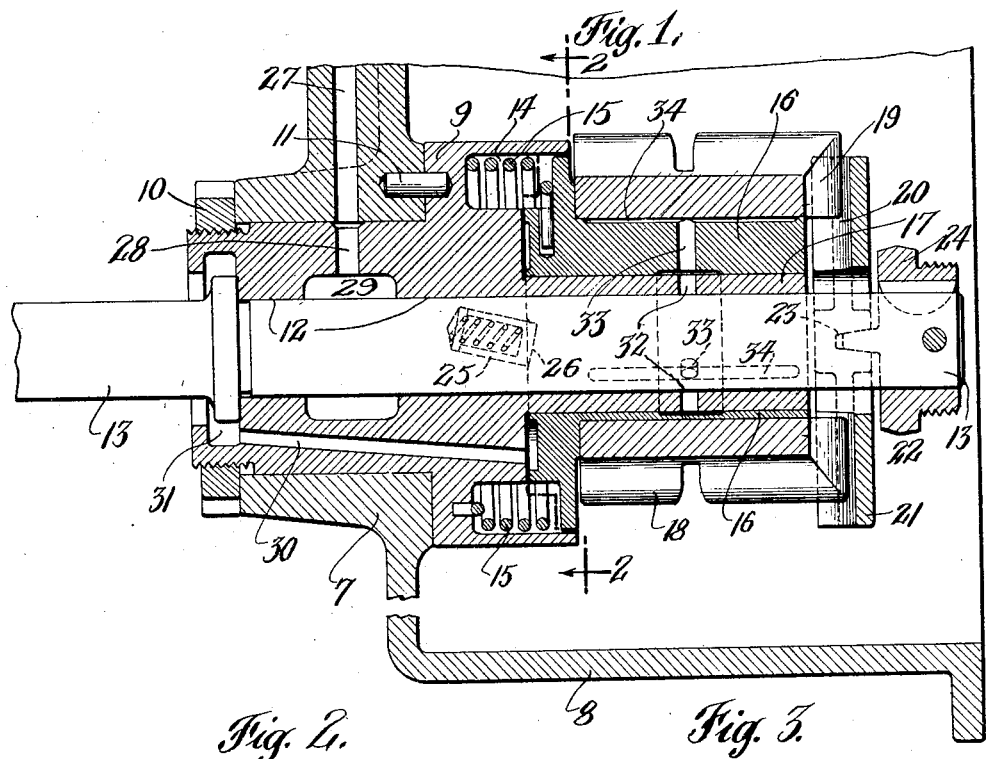
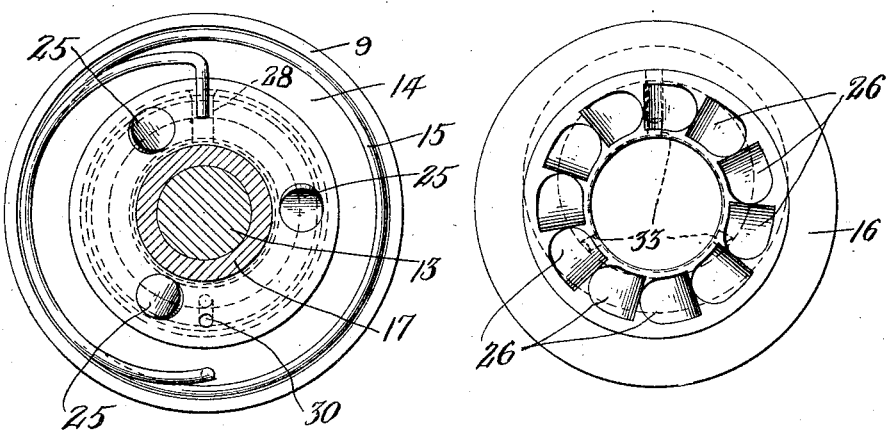
WITNESS
Gustav Genzlinger
INVENTOR
Fred C. Thompson
BY
ATTORNEYS Patented Oct. 9, 1928.

1,686,672

UNITED STATES PATENT OFFICE.

FRED C. THOMPSON, OF DETROIT, MICHIGAN, ASSIGNOR TO MORSE CHAIN COMPANY, A CORPORATION OF NEW YORK.

AUTOMATIC COMPENSATING SPROCKET.

Application filed March 10, 1924. Serial No. 693,018.

This invention relates to improvements in devices for taking up slack in drive chains and is particularly useful in front end drives for automobiles where it is desirable to maintain accurate angular relation of the various shafts comprising the drive.

I aim to provide a rigid mounting for the device and ample bearing surfaces for the operating parts; to supply lubricant to the operating parts and in general to make the construction of the device simple, rugged, durable and easy to manufacture, and the assembly thereof easy. I also aim to provide a device which may be taken down and reassembled from the outside of the frame or casing in which it is mounted, so that broken or worn parts may be readily replaced. How these and other advantages may be realized, through my invention in a novel manner will appear from my description hereinafter of the best construction embodying the invention that is known to me.

In the drawings Fig. 1 is a longitudinal section through my device.

Fig. 2 is a section on the line 2—2 of Fig. 1 with the coiled spring in elevation, and Fig. 3 is a face view of the eccentric member looking toward the right in Fig. 1.

The particular frame 7 to which the device is here shown secured to that of a front end drive for an automobile, which frame is formed in the shape of a casing 8. The body 9 of the adjusting unit is rigidly secured to the frame 8 by means of the nut 10 and the dowel 11 and provides an extended bearing 12 for the shaft 13. The portion of the body extending from the frame is provided with the annular pocket 14 which forms a housing for the coiled spring 15. This spring is fastened at one end to the body 9 and at its other end to the eccentric 16 which is preferably made of bronze or other suitable metal possessing the proper wearing qualities for working with the hard metal form which the sprockets are usually made. The body 9 is provided with a sleeve like portion 17 which forms a bearing for the eccentric member 16.

It will be seen that by this construction a rigid mounting is obtained for the device, which mounting provides ample bearing surface for the shaft and for the eccentric member. In other words the device may be termed a self contained unit, there being no parts to cause wear on the frame of the associated mechanism. This construction lends itself readily to the removal and replacement of worn or broken parts, which may be accomplished from the outside of the frame or casing, thus avoiding the necessity of taking down the associated mechanism which would be an expensive and complicated procedure. This feature is particularly useful where the device is used for front end drives of automobiles.

The chain sprocket 18 is rotatably mounted on the eccentric 16 and is provided with the jaws 19 for engaging the recesses 20 in the floating member 21 of the flexible coupling 22. On its opposite face the member 21 has recesses 23 for engaging the jaws of the other coupling member 24 which is pinned to the shaft 13.

It will be seen that when the chain becomes slack the coiled spring rotates the eccentric 16 which shifts the center of the sprocket wheel 18 with relation to shaft 13 in a direction to take up the slack. In order to prevent the eccentric from shifting back to the position of looser adjustment I have provided a latch mechanism consisting of the latches 25 which are mounted in the body 9 and the coacting notches 26 which are formed on the face of the eccentric member 16.

As a means for supplying lubricant to the working parts of the device I have provided the passage 27 in the frame 7. This passage communicates with the hole 28 in the body 9 which in turn communicates with the annular groove 29 therein, thus supplying lubricant to the shaft 13. There is another passage 30 which supplies lubricant from the annular cup 31 to the latch mechanism. The lubricant works its way along the shaft and then by way of holes 32 in the sleeve like portion of the body to the inside bearing surface of the eccentric member 16 then through holes 33 to the grooves 34 which supply lubricant to the sprocket.

I claim:

1. An automatic center shifting device for taking up the slack in drive chains comprising in combination a body portion, a shaft rotatably mounted in and extending longitudinally of the body portion, an eccentric rotatably mounted on the body portion, a coiled spring attached to the body portion and to the eccentric and tending to turn the eccentric in one direction, means carried by the body portion adapted to engage notches in the eccentric for preventing the eccentric from turning in the opposite direction, a sprocket rotatably mounted on the eccentric and means for flexibly connecting the sprocket and shaft.

2. The combination in a tension adjuster for drive chains, of a frame, a body portion rigidly mounted in the frame, a rotatable shaft having its bearing in the body portion, tension altering means rotatably mounted on the body portion, a sprocket rotatably mounted on the tension altering means, means for flexibly connecting the shaft and sprocket, latch means preventing the tension altering means from returning to positions of less tension, and passages leading to the shaft, the latch means, the tension altering means, and the sprocket for supplying lubricant to said parts.

3. A tension adjuster for endless chains comprising in combination with a shaft to be driven, a frame, a sprocket wheel, a driving connection between said wheel and said shaft, a non-rotatable mounting detachably secured to said frame, and means for shifting the centre of the sprocket wheel, said means being rotatable on said mounting and removable with the mounting without disturbing the shaft.

4. A tension adjuster for endless chains comprising in combination with a shaft to be driven, a frame, a sprocket wheel, a driving connection between said wheel and said shaft, a non-rotatable mounting detachably secured to said frame and means for automatically shifting the centre of the sprocket as the chain tends to become slack including means rotatable on said mounting, said non-rotatable mounting and said automatic means including the rotatable means being removable without disturbing the shaft.

5. A tension adjuster unit for endless chains comprising in combination with a shaft to be driven and a frame thru which the shaft extends, a mounting detachably secured to said frame in a non-rotative position, an eccentric rotatably carried by said mounting, a sprocket wheel rotatably mounted on said eccentric and a connection between said shaft and said wheel.

6. A tension adjuster unit for endless chains comprising in combination with a shaft to be driven and a frame thru which the shaft extends, a mounting detachably secured to said frame in a non-rotative position, an eccentric rotatably carried by said mounting, a sprocket wheel rotatably mounted on said eccentric and a connection between said shaft and said wheel, together with means for rotating the eccentric.

In testimony whereof, I have hereunto signed my name.

FRED C. THOMPSON.